(12) United States Patent
Bentz et al.

(10) Patent No.: US 9,091,386 B2
(45) Date of Patent: Jul. 28, 2015

(54) MOUNTING SYSTEM WITH INCORPORATED WIRELESS SYSTEM FOR USE WITH AUDIO/VISUAL DEVICES OR THE LIKE

(75) Inventors: Timothy Bentz, Bartlett, IL (US); Paul Berkley, Shorewood, IL (US); Frank Laurendi, Plainfield, IL (US)

(73) Assignee: Peerless Industries, Inc., Aurora, IL (US)

(*) Notice: Subject to any disclaimer, the term of this patent is extended or adjusted under 35 U.S.C. 154(b) by 325 days.

(21) Appl. No.: 13/484,950

(22) Filed: May 31, 2012

(65) Prior Publication Data

US 2012/0320506 A1 Dec. 20, 2012

Related U.S. Application Data

(60) Provisional application No. 61/496,822, filed on Jun. 14, 2011, provisional application No. 61/532,453, filed on Sep. 8, 2011.

(51) Int. Cl.
| | |
|---|---|
| H05K 5/00 | (2006.01) |
| H05K 7/00 | (2006.01) |
| G06F 1/16 | (2006.01) |
| F16M 13/02 | (2006.01) |
| F16M 11/08 | (2006.01) |
| F16M 11/20 | (2006.01) |

(52) U.S. Cl.
CPC ............. *F16M 13/02* (2013.01); *F16M 11/08* (2013.01); *F16M 11/2014* (2013.01); *F16M 13/027* (2013.01); *G06F 1/1607* (2013.01); *G06F 1/1626* (2013.01); *G06F 1/1632* (2013.01)

(58) Field of Classification Search
CPC ... G06F 1/1601; G06F 1/1607; G06F 1/1626; G06F 1/1632; F16M 13/02; F16M 13/022; F16M 13/027
USPC ................ 361/679.21, 679.41; 248/917–920
See application file for complete search history.

(56) References Cited

U.S. PATENT DOCUMENTS

| | | | |
|---|---|---|---|
| 6,532,152 B1* | 3/2003 | White et al. ................. 361/692 |
| D558,562 S | 1/2008 | Ciungan et al. | |
| D558,563 S | 1/2008 | Ciungan et al. | |
| 7,414,831 B1* | 8/2008 | Brown et al. ............ 361/679.27 |
| 7,487,943 B1 | 2/2009 | Gillespie | |
| 7,641,163 B2 | 1/2010 | O'Keene | |
| 7,753,332 B2 | 7/2010 | O'Keene | |
| D623,177 S | 9/2010 | Molter et al. | |
| 7,832,700 B2 | 11/2010 | Ciungan | |
| 7,854,415 B2 | 12/2010 | Holbrook et al. | |

(Continued)

OTHER PUBLICATIONS

HD Flow Wireless Multimedia Kit, HDS100, HDS100-X Brochure, Peerless Industries, Inc. 2011.

*Primary Examiner* — Anthony Haughton
(74) *Attorney, Agent, or Firm* — Foley & Lardner LLP

(57) ABSTRACT

A mounting system for attaching a device to a surface and housing a wireless receiver for communicating a wireless signal to the device. According to various embodiments, the mounting system includes a surface mount portion, a device mount portion, and a receiver housing assembly. The surface mount portion is configured to attach to the surface and is operatively connected to the device mount portion. The receiver housing is connected to the device mount portion and is sized and configured to house a wireless receiver for receiving and communicating a wireless high definition signal to a device mounted to the mounting system.

18 Claims, 18 Drawing Sheets

(56) References Cited

U.S. PATENT DOCUMENTS

| | | |
|---|---|---|
| 7,866,621 B1 | 1/2011 | Walters |
| 7,869,200 B2 * | 1/2011 | Horie ................. 361/679.02 |
| 7,891,622 B1 | 2/2011 | O'Keene |
| 7,898,796 B2 * | 3/2011 | Horie ................. 361/679.02 |
| 7,963,489 B2 | 6/2011 | O'Keene et al. |
| 8,081,429 B2 * | 12/2011 | Horie ................. 361/679.02 |
| 8,094,438 B2 * | 1/2012 | Dittmer et al. ........... 361/679.01 |
| 8,284,549 B2 * | 10/2012 | Liu ................. 361/679.23 |
| 8,508,918 B2 * | 8/2013 | Dittmer et al. ........... 361/679.01 |
| 2005/0047081 A1 * | 3/2005 | LaPorte et al. ................. 361/686 |
| 2009/0174998 A1 * | 7/2009 | Struthers et al. ......... 361/679.41 |
| 2010/0195279 A1 * | 8/2010 | Michael ................. 361/679.41 |
| 2010/0237210 A1 * | 9/2010 | Anderson et al. .......... 248/274.1 |
| 2011/0164368 A1 * | 7/2011 | Leng ................. 361/679.21 |

\* cited by examiner

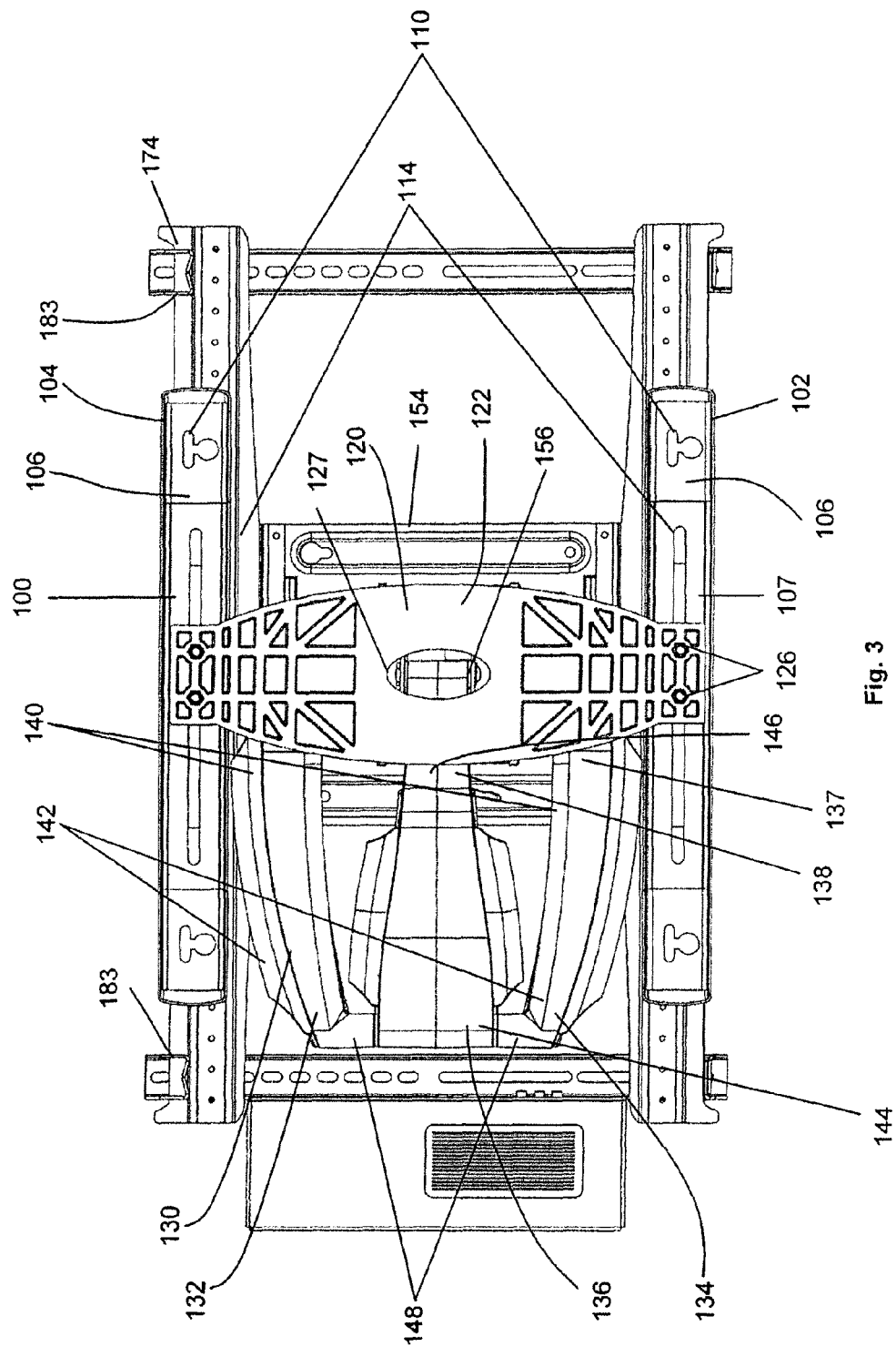

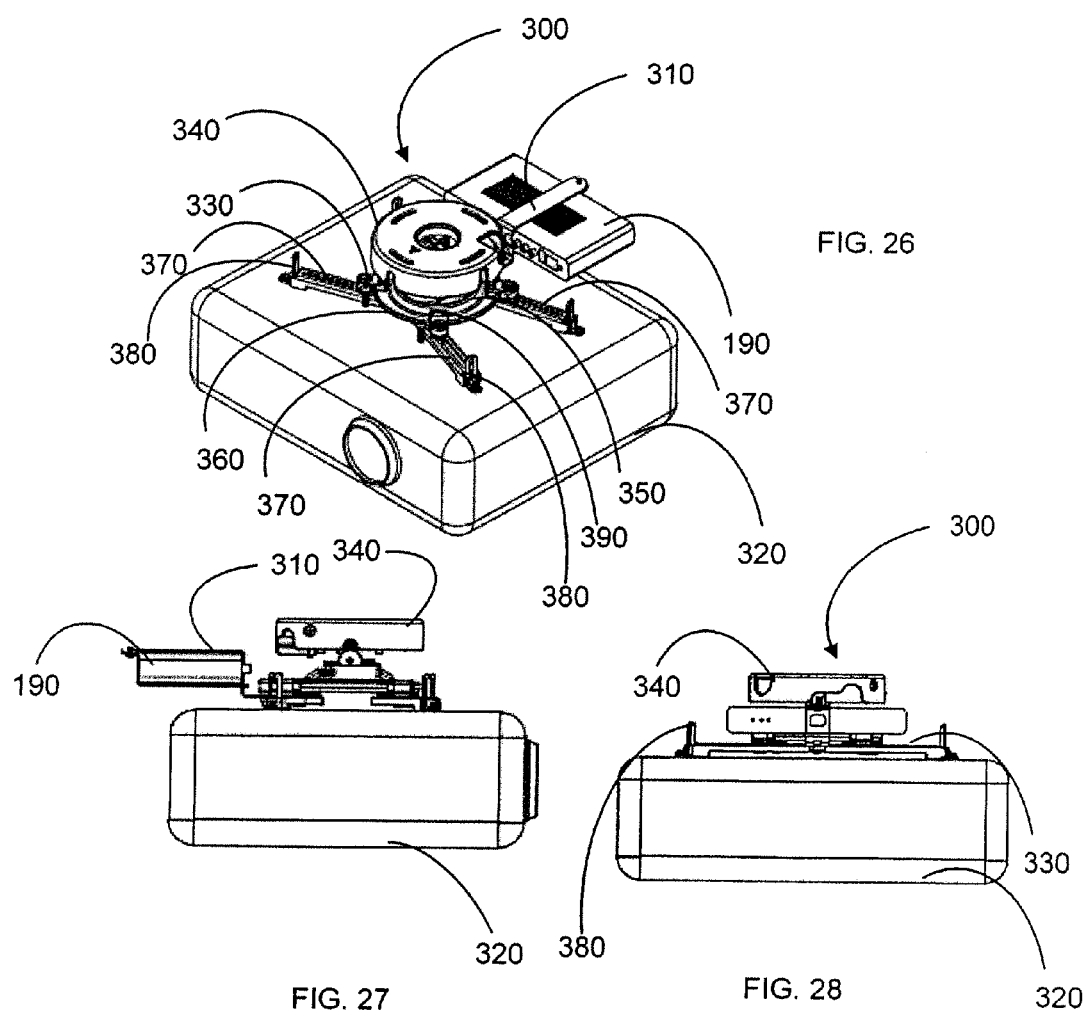

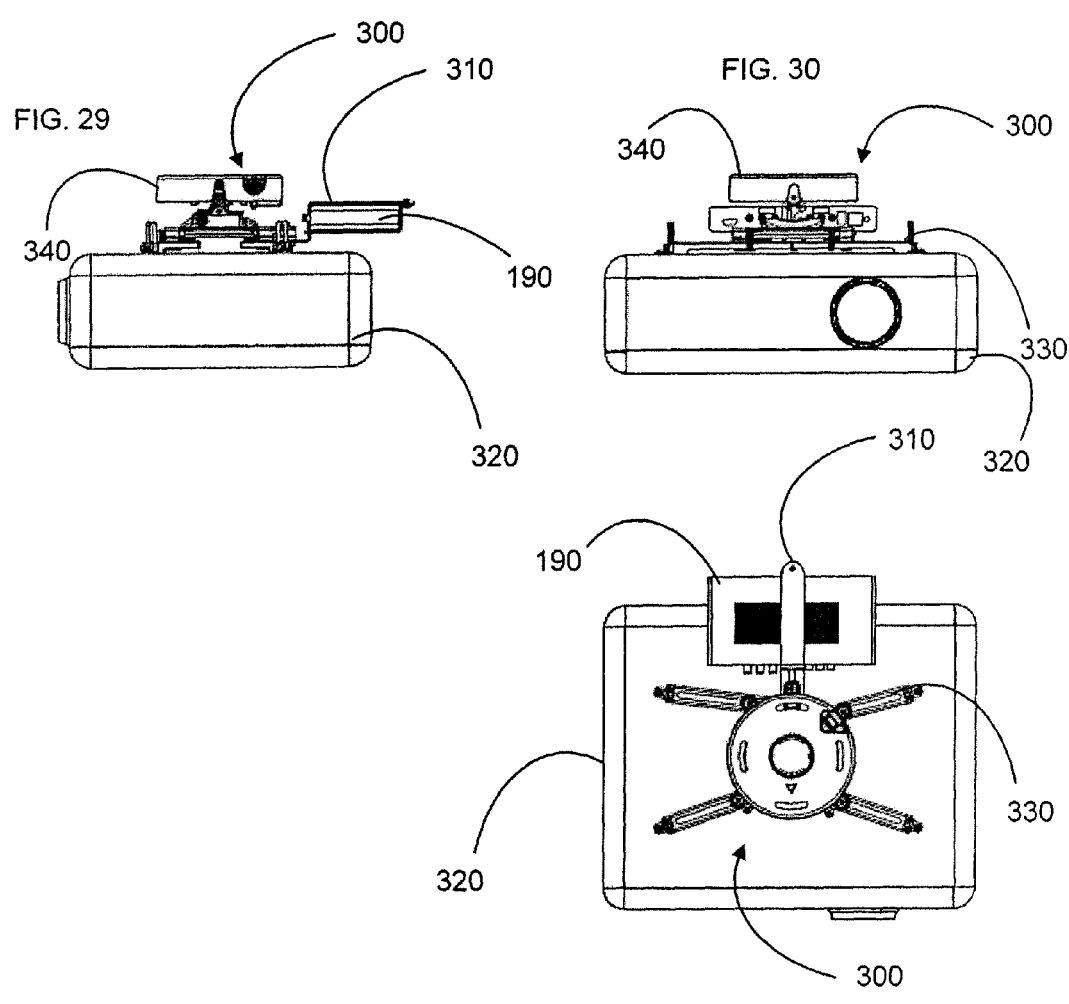

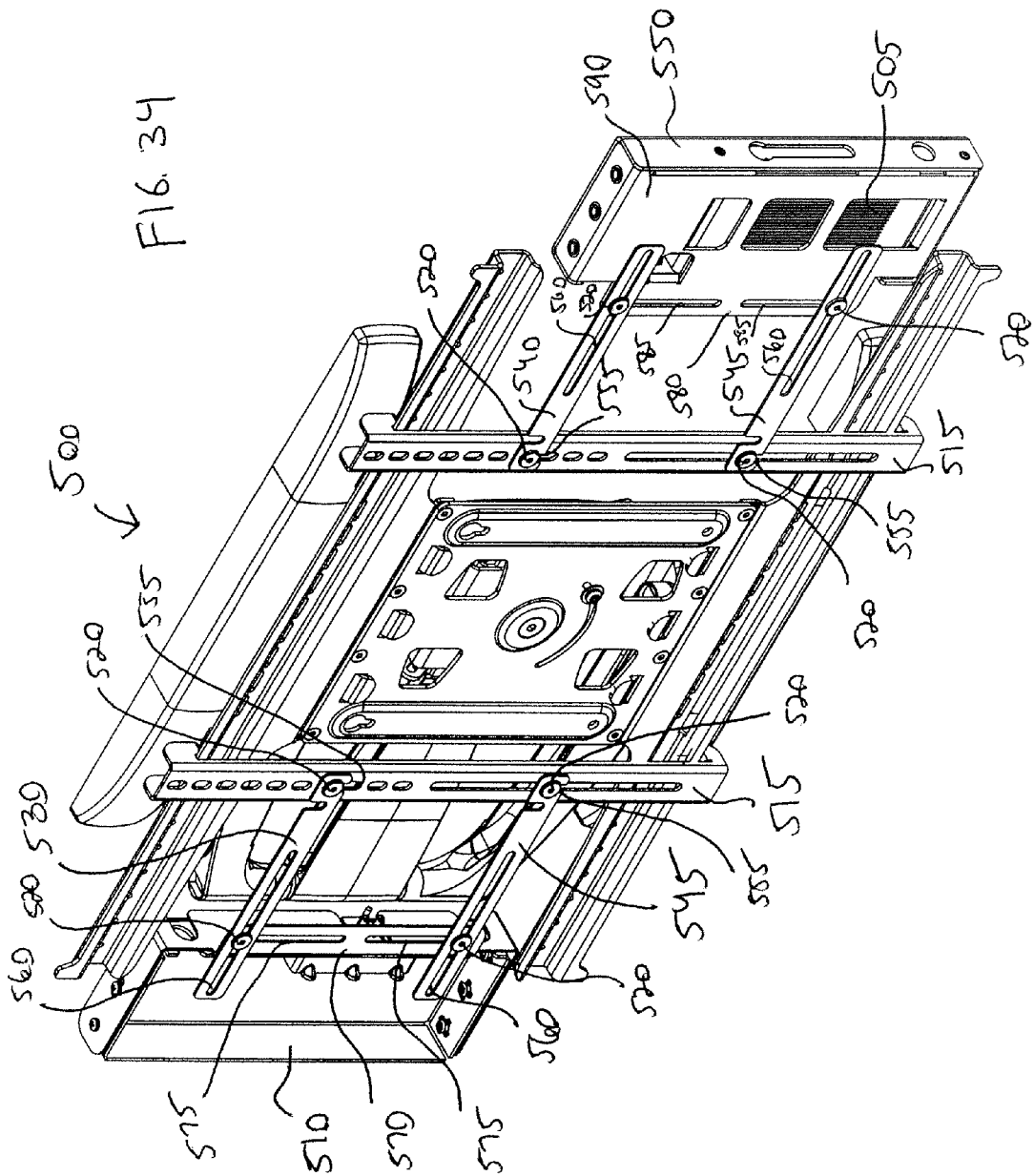

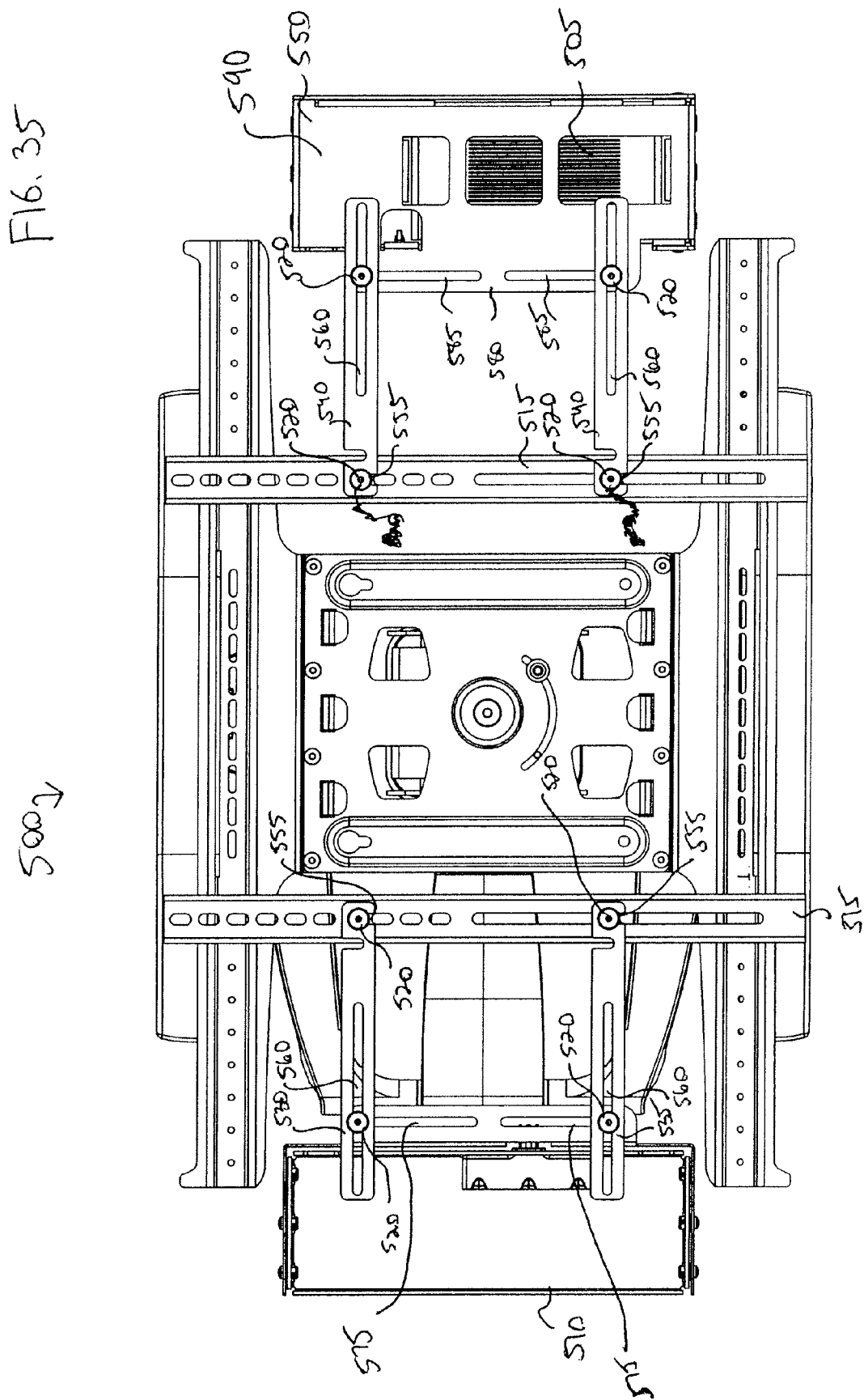

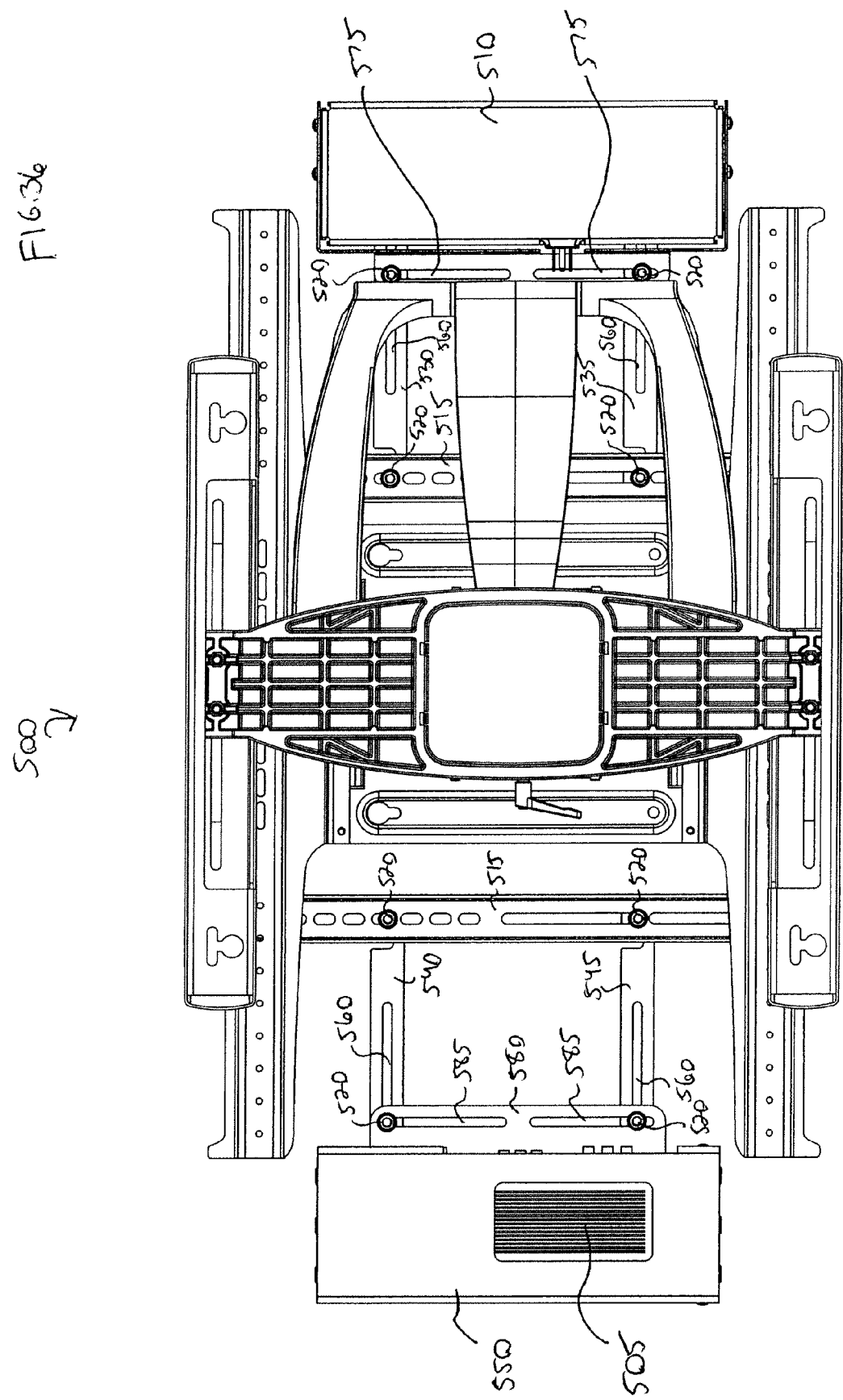

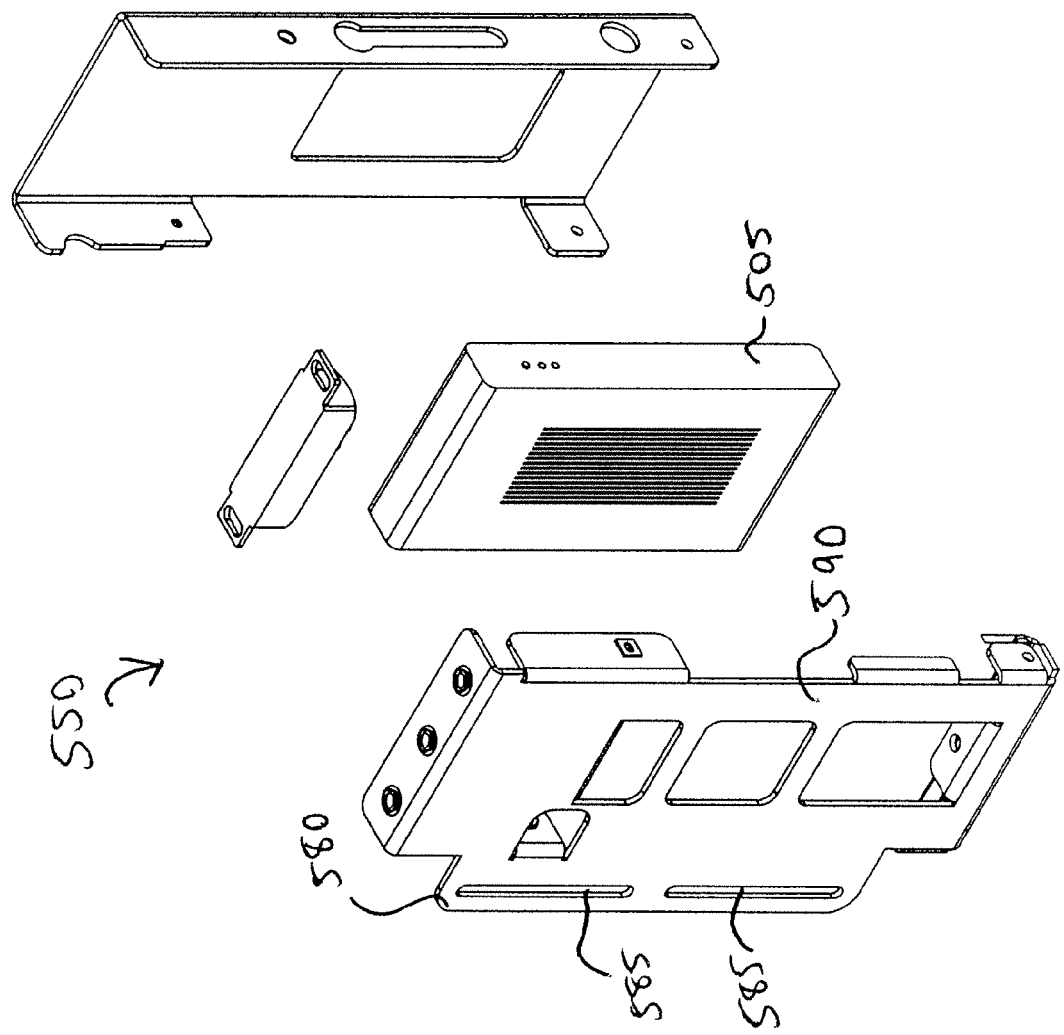

MOUNTING SYSTEM WITH INCORPORATED WIRELESS SYSTEM FOR USE WITH AUDIO/VISUAL DEVICES OR THE LIKE

CROSS-REFERENCE TO RELATED APPLICATIONS

The present application claims priority to U.S. Provisional Patent Application No. 61/496,822, entitled "Mounting System With Incorporated Wireless System for Use With Audio/Visual Devices or the Like" and filed Jun. 14, 2011. The present application also claims priority to U.S. Provisional Patent Application No. 61/532,453, entitled "Mounting System With Incorporated Wireless System for Use With Audio/Visual Devices or the Like" and filed Sep. 8, 2011. The contents of these applications are incorporated herein by reference in their entirety.

FIELD OF INVENTION

The present invention relates generally to mounting systems. More particularly, the present invention relates to mounting systems for flat panel displays.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display ("LCD") flat panel displays have continued to fall, and the quality for the same devices have improved, more and more businesses and individuals have purchased such devices for both home and business purposes.

One of the advantages of flat panel display devices that customers have found particularly appealing is their relatively low thickness. Because conventional "tube" televisions have a relatively large depth, the placement options for such devices are quite limited. In the residential setting, most users require a television stand or large entertainment center to house the television. Such stands or entertainment centers can take up significant floor space, which is often undesirable. In the commercial or educational setting, users will often install large overhead mounting systems that can contain the television. However, these systems usually require professional installation and, once the television is secured to the mount, it is often difficult to access and adjust due to its height. With flat panel televisions, on the other hand, users are presented with a relatively new option: mounting the television directly to a mounting surface such as a wall. By mounting the television to the wall, the user can eliminate consumption of potentially valuable floor space.

Although the introduction of flat panel display devices on a wide scale has presented new opportunities to both residential and commercial customers, it has also presented new challenges. In particular, mounting a flat panel television directly to a mounting surface such as a wall presents issues for neatly and discreetly routing power cords and input cables to the television. For example, typical wall-mount installations include a television being mounted to a wall and a media source located a distance from the television. Thus, the input cables often must be routed across a wall from the media source to the television. One way to solve this routing issue is to route the input cables through the wall. However, this is a costly and time-consuming option.

SUMMARY

One embodiment provides for a mounting system for attaching an audio/visual device, such as a flat panel display, to a surface and housing a wireless receiver for communicating a wireless signal to the device. The mounting system comprises a surface mount portion, a device mount portion, and a receiver housing assembly. The surface mount portion is configured to attach to the surface and is operatively connected to the device mount portion. The receiver housing assembly is operatively connected to the device mount portion and is sized and configured to house a wireless receiver for receiving and communicating a wireless high definition signal to the device mounted to the mounting system.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 3 is a rear elevational view of the mounting system of FIG. 1;

FIG. 26 is a perspective view of an exemplary projector mount assembly, coupled to a projector, constructed in accordance with an embodiment of the present invention;

FIG. 27 is a left side elevational view of the projector mount assembly and projector of FIG. 26;

FIG. 28 is a rear elevational view of the projector mount assembly and projector of FIG. 26;

FIG. 29 is a right side elevational view of the projector mount assembly and projector of FIG. 26;

FIG. 30 is a front elevational view of the projector mount assembly and projector of FIG. 26;

FIG. 31 is a top plan view of the projector mount assembly and projector of FIG. 26;

FIG. 34 is an isometric view of a mounting system constructed in accordance with still another embodiment;

FIG. 35 is a front elevational view of the mounting system of FIG. 34;

FIG. 36 is a rear elevational view of the mounting system of FIG. 34; and

FIG. 37 is an exploded perspective view of the receiver housing assembly of the mounting system of FIG. 34.

DETAILED DESCRIPTION OF VARIOUS EMBODIMENTS

Figure 1:
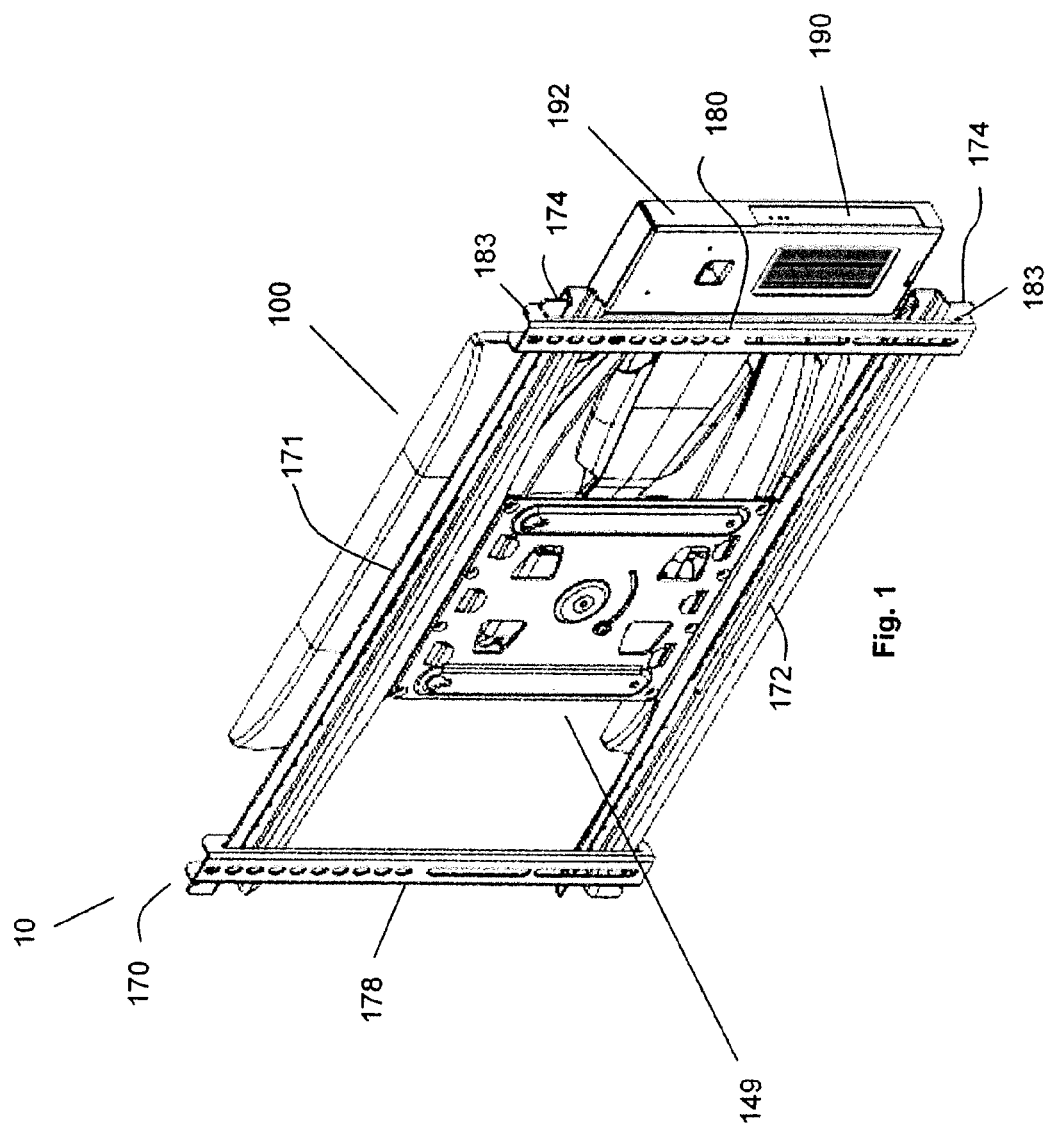
FIG. 1 is a perspective view of a mounting system constructed in accordance with an embodiment of the present invention.
Figure 2:
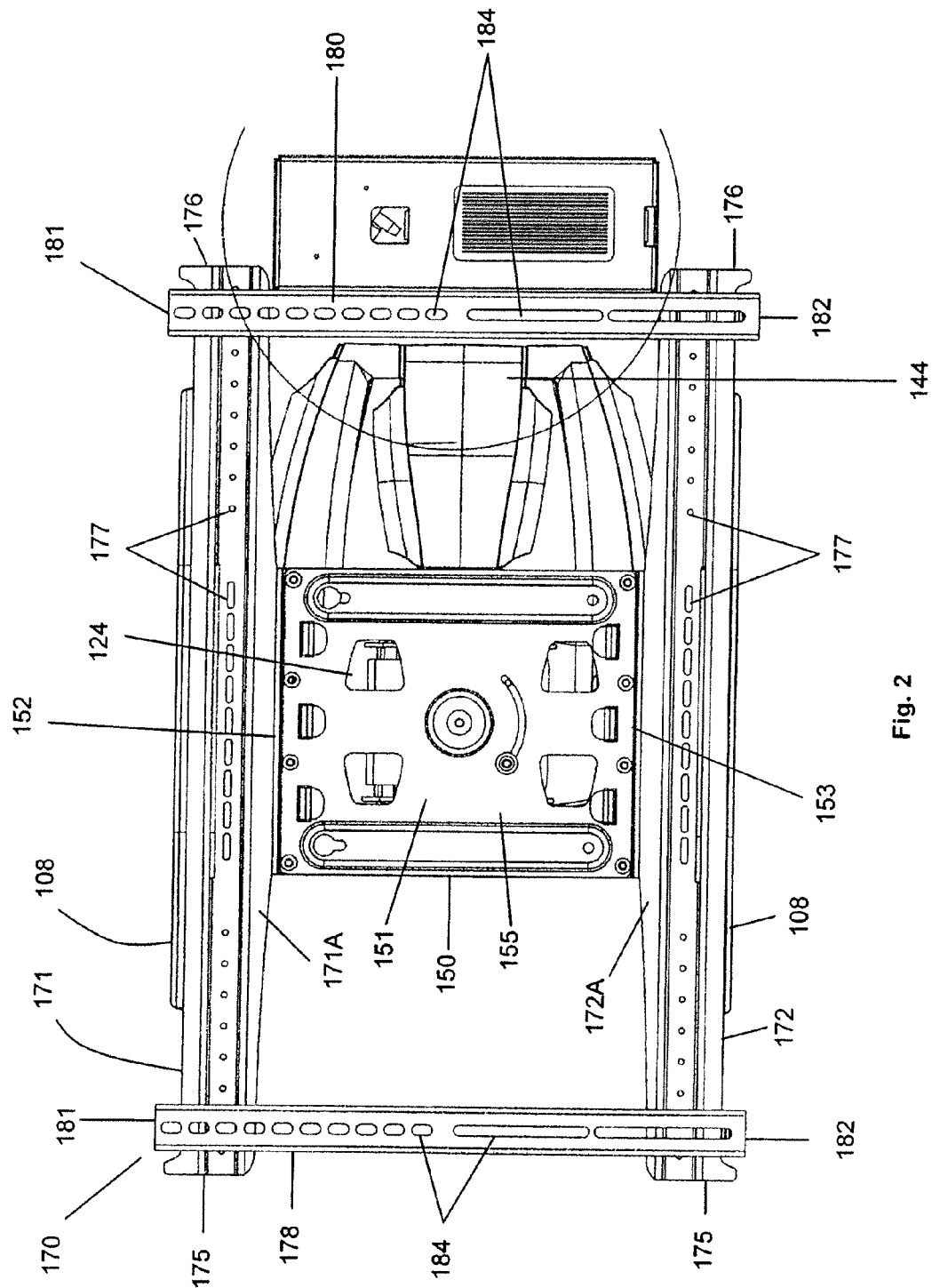
FIG. 2 is a front elevational view of the mounting system of FIG. 1.
Figure 5:
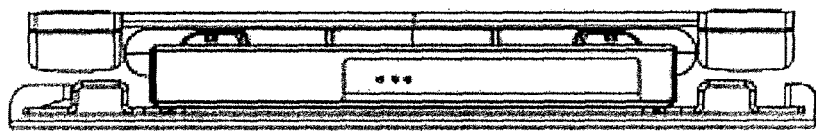
FIG. 5 is a right side elevational view of the mounting system of FIG. 1.
Figure 4:
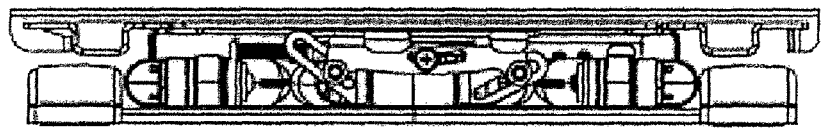
FIG. 4 is a left side elevational view of the mounting system of FIG. 1.
Figure 6:
FIG. 6 is a top plan view of the mounting system of FIG. 1.

FIGS. 1-3 show a mounting system 10 for attaching a device to a surface and housing a wireless receiver 190 for communicating a wireless signal to the device. In the embodiment depicted in FIGS. 1-3, the mounting system 10 includes a surface mount portion 100, a device mount portion 149, and a receiver housing assembly 192. The surface mount portion 100 is configured to attach to the surface and is operatively connected to the device mount portion 149. The receiver housing assembly 192 is operatively connected to the device mount portion 149 and is sized and configured to house a wireless receiver 190 for receiving and communicating a wireless signal to a device mounted to the mounting system 10.

Figure 9:
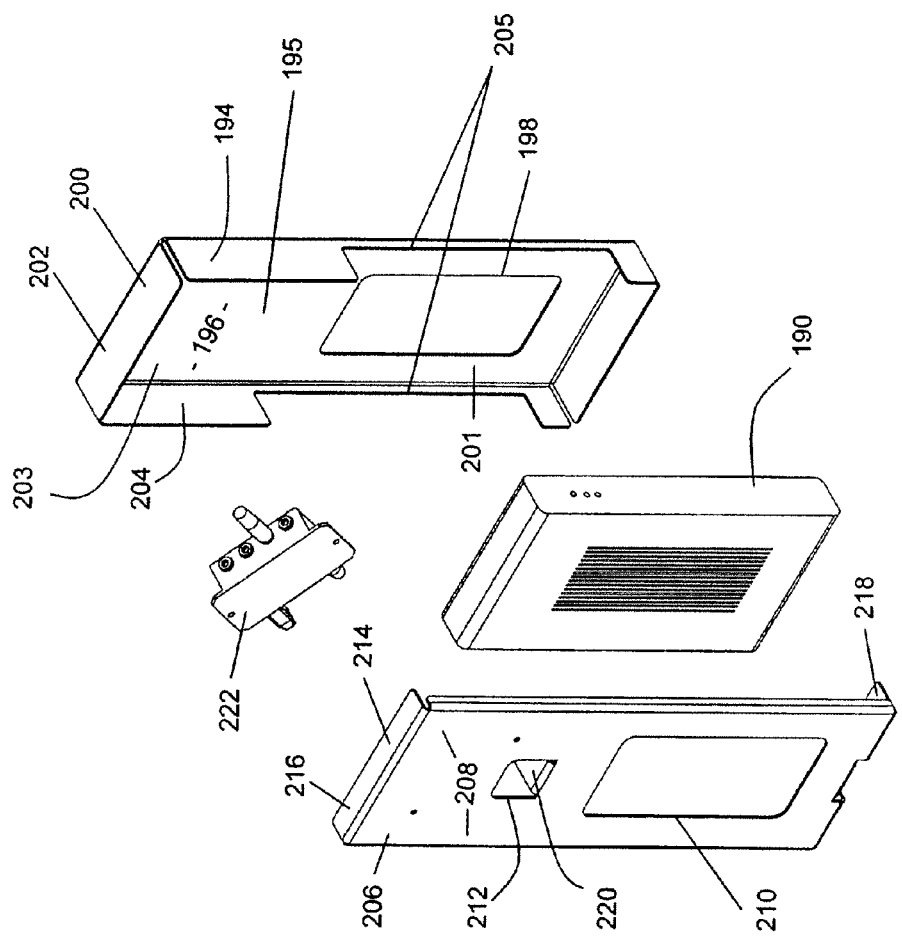
FIG. 9 is an exploded view of a receiver housing assembly.
Figure 10:
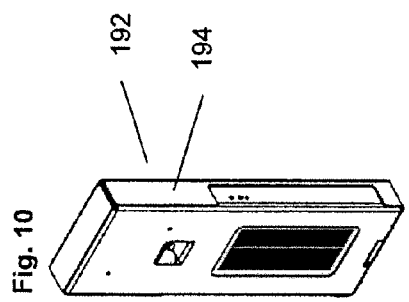
FIG. 10 is a perspective view of an assembled receiver housing assembly.
Figure 14:
FIG. 14 is a right side elevational view of the receiver housing assembly of FIG. 10.
Figure 15:
FIG. 15 is a top plan view of the receiver housing assembly of FIG. 10.
Figure 11:
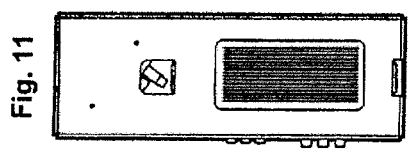
FIG. 11 is a front elevational view of the assembled receiver housing assembly of FIG. 10.
Figure 16:
FIG. 16 is a bottom plan view of the receiver housing assembly of FIG. 10.
Figure 13:
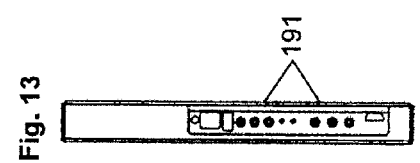
FIG. 13 is a left side elevational view of the receiver housing assembly of FIG. 10.
Figure 12:
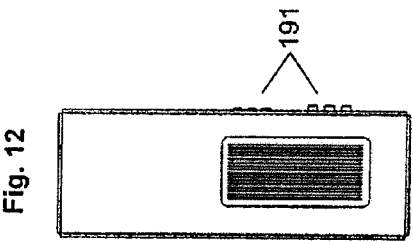
FIG. 12 is a rear elevational view of the receiver housing assembly of FIG. 10.
Figure 17:
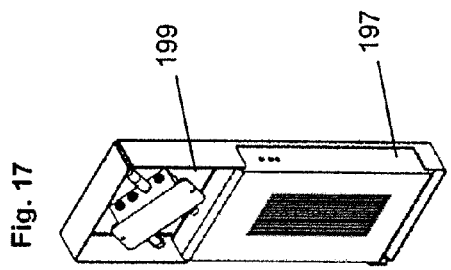
FIG. 17 is a perspective view of a partially assembled receiver housing assembly.
Figure 21:
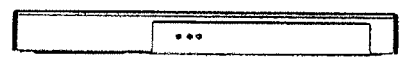
FIG. 21 is a right side elevational view of the partially assembled receiver housing assembly of FIG. 17.
Figure 22:
FIG. 22 is a top plan view of the partially assembled receiver housing assembly of FIG. 17.
Figure 18:
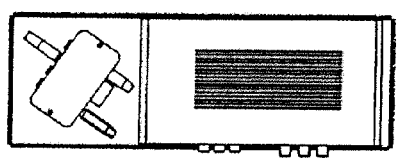
FIG. 18 is a front elevational view of the partially assembled receiver housing assembly of FIG. 17.
Figure 23:
FIG. 23 is a bottom plan view of the partially assembled receiver housing assembly of FIG. 17.
Figure 20:
FIG. 20 is a left side elevational view of the partially assembled receiver housing assembly of FIG. 17.
Figure 19:
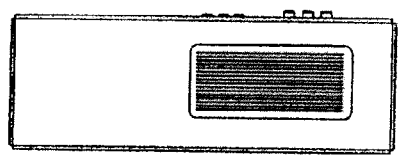
FIG. 19 is a rear elevational view of the partially assembled receiver housing assembly of FIG. 17.
Figure 24:
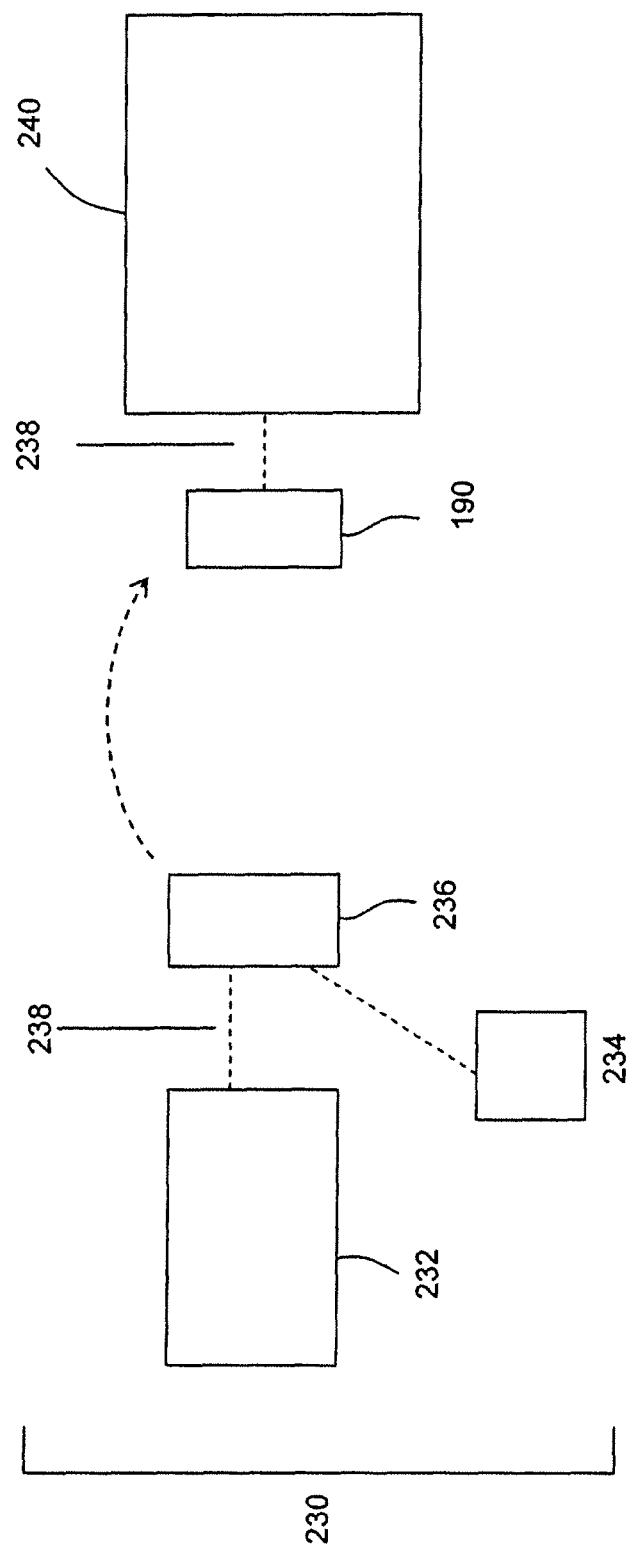
FIG. 24 illustrates an exemplary representation of a wireless communication system.

In one embodiment depicted in FIG. 9, the receiver housing assembly 192 comprises a receiver housing 194 and a receiver housing lid 206. The receiver housing 194 comprises a boxed-shaped compartment 195 with a generally flat bottom 196, a receiver housing opening 198 in the bottom 196, and a plurality of walls 200 with an outer surface 202 and an inner surface 204. The receiver housing 194 comprises a first end 201 proximate the receiver housing opening 198 and a second end 203 distal the first end 201. One or more of the plurality of walls 200 may include one or more cutouts 205. The receiver housing assembly 192 may also comprise a receiver housing lid 206 having a generally flat top 208 with dimensions substantially similar to the dimensions of the receiver housing 194. The receiver housing lid 206 further comprises a plurality of tabs 214 with an outer surface 216 and an inner surface 218, a receiver housing lid opening 210, a receiver housing aperture 212, and an aperture tab 220. The aperture tab 220 extends substantially perpendicular to the flat top 208, in the same direction as the tabs 214. As will be appreciated, the receiver housing assembly 192 may be sized to accommodate a wireless receiver 190 of various sizes.

To assemble the receiver housing assembly 192 depicted in FIG. 9, the receiver housing lid 206 is installed on the receiver housing 194, such that the tabs 214 are disposed within the receiver housing 194, adjacent to, and in engagement with, the inner surface 204 of the plurality of walls 200, forming compartment 195. When assembled, the aperture tab 220 divides compartment 195 into a first compartment 197, corresponding to the first end 201 of the receiver housing 194, and a second compartment 199, corresponding to the second end 203 of the receiver housing 194. As depicted in FIG. 9, the receiver housing lid 206 is retained to the receiver housing 194 by the engagement of the outer surface of tabs 214 with the inner surface of the plurality of walls 200. However, other alternative embodiments may secure the receiver housing lid 206 to the receiver housing 194 by other mechanical means such as bolts, screws, hinges, clasps, magnets, or the like.

Figure 25:
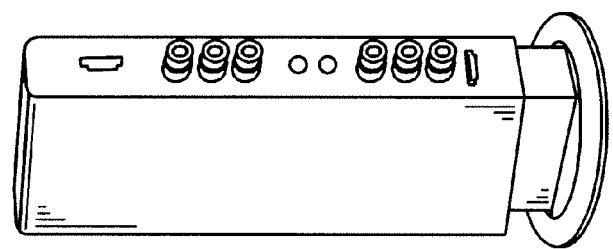
FIG. 25 illustrates an exemplary representation of a wireless receiver.

As illustrated in FIG. 1, the mounting system 10 may further comprise a wireless receiver 190 and an adapter 222, each disposed within the receiver housing assembly 192. FIG. 25 illustrates an exemplary representation of the wireless receiver 190. The wireless receiver 190 may include a plurality of jacks 191, for example, HDMI, RCA, USB, ethernet, 3.5-mm TRS, and an infrared port. For wireless connectivity, the wireless receiver 190 includes a radio and antenna for receiving and supporting OFDM-based wireless signals such as IEEE 802.11n 5 GHz LAN radio frequencies, which may include high definition video signals. The wireless receiver 190 generally has a range of approximately 131 feet. The wireless receiver 190 also supports various encryption algorithms, including, for example, 802.1x, 802.11i, WPA2, WPPA, and WEP 64/128 TKIP AES.

For video compression and distribution, the wireless receiver 190 includes full high definition 1080p (60 Hz) decoding with HDCP-compliant H.264 baseline profile at level 4.2. Upon receiving and processing an input signal, the wireless receiver 190 may output the signal through composite video, component video, or HDMI, providing video resolutions up to 1080p. The wireless receiver supports receiving and outputting both analog and digital audio, including AC-3 Dolby Digital 5.1 and DTS Digital Audio. In addition, the receiver is capable of less than 30 milliseconds latency of encoding-decoding in 1080p at 60 Hz during high definition video streaming and provides infrared blaster support. It should be recognized, however, that the precise wireless receiver 190 and its function and features may vary.

The receiver housing assembly 192 described above may be operatively connected to various types of mounting systems 10. For example, the receiver housing assembly 192 may be operatively connected to fixed mounts or moveable mounts. Regardless of the type of mounting system 10 used, the receiver housing assembly 192 may be removable or non-removable from the mounting system 10. FIGS. 1-8 illustrate one embodiment of a mounting system 10 comprising a receiver housing assembly 192 operatively connected thereto. As illustrated in FIGS. 1-8, the mounting system 10 comprises a surface mount portion 100 operatively connected to an arm assembly 130, a device bracket 150 operatively connected to the arm assembly 130, and an adapter bracket assembly 170 operatively connected to the device bracket 150.

Figure 7:
FIG. 7 is a bottom plan view of the mounting system of FIG. 1.
Figure 8:
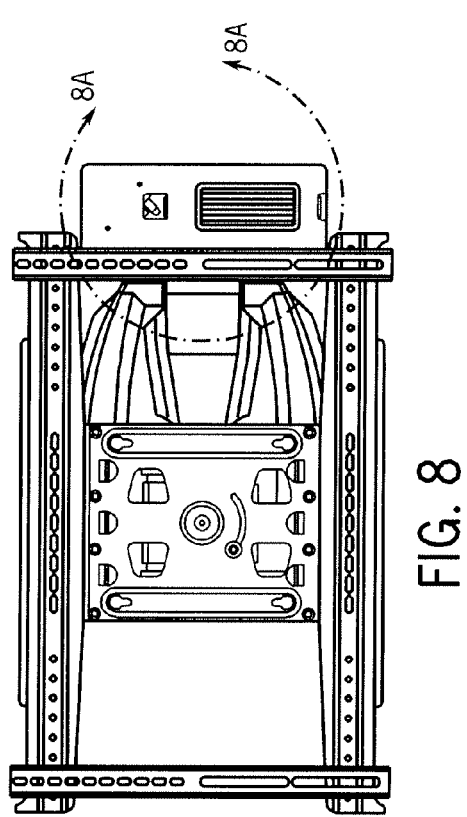
FIG. 8 is another front elevational view of the mounting system of FIG. 1, including a call-out to a receiver housing assembly.
Figure 8A:
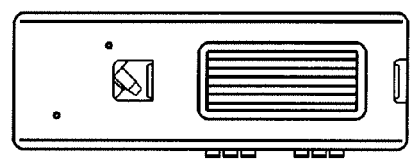
FIG. 8A is another front elevational view of the receiver housing assembly of FIG. 8.

As illustrated in FIGS. 1, 2, and 7, the surface mount portion 100 comprises a bottom surface track 102, a top surface track 104, and a surface plate 120. The bottom surface track 102 and the top surface track 104 are each rectangular in shape with a surface side 106 and a device side 108. Both the bottom surface track 102 and the top surface track 104 may include a plurality of primary openings 110 disposed on the surface side 106 for use in operatively connecting the bottom surface track 102 and top surface track 104 to a mounting surface such as a wall using fasteners such as screws, bolts, or the like. The bottom surface track 102 and the top surface track 104 may further comprise a plurality of secondary openings 114 for operatively connecting the surface plate 120 to the bottom surface track 102 and the top surface track 104. It should be noted that, in various embodiments, the plurality of primary openings 110 are substantially horizontally spaced commensurate with standard wall stud spacing and may receive bolts, screws, or other connecting elements. Additionally, in various embodiments, the plurality of secondary openings 114 each comprise a substantially horizontal elongated slot to permit lateral adjustment of the surface plate 120, as described in further detail below.

In one embodiment, the surface plate 120 comprises a relatively thin plate with a surface side 122, a device side 124, and a plurality of surface plate openings 126 for accepting bolts, screws, or other connecting elements. The surface plate 120 may be connected to the bottom surface track 102 and the top surface track 104 via the plurality of secondary openings 114 and the plurality of surface plate openings 126. As best illustrated in FIG. 3, the surface plate 120 may be connected "behind" the bottom and the top surface track 102 and 104 (e.g. adjacent to the mounting surface). In this configuration, the bottom surface track 102 and the top surface track 104 may further include a recess 107 on the surface side 106 corresponding at least to the thickness of surface plate 120 so that, once connected, the surface side of the bottom and the top surface track 102 and 104 may substantially contact the mounting surface. As depicted in FIG. 3, the surface plate 120 may operatively connect to the bottom surface track 102 and the top surface track 104 via fasteners through the plurality of secondary openings 114 and the plurality of surface plate openings 126. In this embodiment, because the plurality of secondary openings 114 comprises substantially horizontal elongated slots, the surface plate 120 may be adjusted laterally along the plurality of secondary openings 114.

The surface plate 120 may further include one or more other apertures or recesses to receive portions of the mounting system 10 when in the retracted configuration. For example, a bracket aperture 127 may be included in the surface plate 120 to receive a portion of the device bracket 150 when the mounting system 10 is fully or partially retracted as shown in FIG. 3. This feature reduces or eliminates a point of interference among components in the mounting system 10, reducing the overall side profile of the mounting system 10 when fully retracted. Other alternative embodiments may include similar apertures or recesses to receive a portion of the arm assembly 130.

In one embodiment, the arm assembly 130 comprises a surface end 137 movably connected to the device side 124 of the surface plate 120. The arm assembly 130 may comprise one or more arms movably connected to one another. For example, in the depicted embodiment, the arm assembly 130 comprises a first arm 132, a second arm 134, and a third arm 136. In this embodiment, the first and second arms 132 and 134 each include a first end 140 and a second end 142 distal the first end 140. The third arm 136 includes a first end 144 proximate the second end 142 of the first and second arms 140 and 142 and a second end 146 distal the first end 144. A pivot portion 148 is disposed proximate the first end 140 and the second end 142 of the first arm 132 and the second arm 134, as well as at the first end 144 and the second end 146 of the third arm 136. The pivot portions 148 disposed at the first end 140 of the first arm 132 and the second arm 134 are configured to movably connect the first and second arms 132 and 134 to the surface plate 120. Similarly, the pivot portion 148 disposed at the second end 142 of the first arm 132 and the second arm 134, as well as at the first end 144 of the third arm 136, are configured to movably connect the first and second arms 132 and 134 to the third arm 136. The pivot portion 148 disposed at the second end 146 of the third arm 136 is configured to movably connect the second end 146 of the third arm 136 to the device bracket 150. Each of the pivot portions 148 may include a hollow portion for accepting an axle or pin. The arm assembly 130 is configured to permit movement of the device bracket 150 with respect to the wall or other surface. In particular, the pivot portions 148 connecting the first arm 132, the second arm 134, and the third arm 136 allow the first arm 132, the second arm 134, and the third arm 136 to nest within each other for a retracted position as illustrated in FIG. 2. Similarly, the first arm 132, the second arm 134, and the third arm 136 can be extended outward from the surface to an intermediate orientation or a fully extended orientation.

The arms of the arm assembly 130 may generally comprise elongated members of a relatively thin construction to minimize the thickness of the mounting system 10 when fully retracted. It will be appreciated that the arms are sized to adequately support the anticipated weight of a mounted device in retracted, intermediate, and fully extended orientations.

In one embodiment, the device bracket 150 comprises a generally flat plate 151 having a top 152, a bottom 153, a surface side 154, and a device side 155. A pivot portion 156 may be connected to the surface side 154 of the device bracket 150. At a device end 138 of the arm assembly 130 distal from the surface end 137, the third arm 136 is movably coupled to the device bracket 150 via the pivot portion 156. In addition to the movement afforded by the moveable connection between the third arm 136 and the device bracket 150 via pivot portion 156, the device bracket is generally tiltable about a horizontal axis substantially parallel to the top horizontal adapter bracket 171 and about a vertical axis substantially parallel to the first vertical adapter bracket 178. Various mechanisms for movably connecting the arm assembly 130 to the device bracket can be found in, for example, in U.S. Pat. Nos. 7,891,622, 7,866,621, 7,832,700, 7,753,332 and 7,641,163, the contents of which are incorporated herein by reference in their entireties.

In one embodiment, the adapter bracket assembly 170 is operatively connected to the device bracket 150 and comprises a top horizontal adapter bracket 171, a bottom horizontal adapter bracket 172, a first vertical adapter bracket 178, and a second vertical adapter bracket 180. The top horizontal adapter bracket 171 and the bottom horizontal adapter bracket 172 each include a first end 175 and a second end 176 distal the first end 175. The top horizontal adapter bracket 171 includes a top device bracket mount 171A and the bottom horizontal adapter bracket 172 includes a bottom device bracket mount 172A. Each of the top and the bottom device bracket mounts 171A and 172A is configured to operatively connect to the device bracket 150. Each of the top horizontal adapter bracket 171 and the bottom horizontal adapter bracket 172 are elongated members comprising a lip 174 along the length and a plurality of openings 177.

The first vertical adapter bracket 178 and the second vertical adapter bracket 180 may each include a first end 181 and a second end 182 distal the first end 181. Each of the first vertical adapter bracket 178 and the second vertical adapter bracket 180 includes a hook 183 disposed at the first end 181 and the second end 182. The hook 183 is configured to operatively connect to the top horizontal adapter bracket 171 and the bottom horizontal adapter bracket 172 as described below in detail. Each of the first vertical adapter bracket 178 and the second vertical adapter bracket 180 are elongated members comprising a plurality of openings 184.

To assemble one embodiment of the adapter bracket assembly 170, the top device bracket mount 171A of the top horizontal adapter bracket 171 is affixed to the top 152 of the device bracket 150, and the bottom device bracket mount 172A of the bottom horizontal adapter bracket 172 is affixed to the bottom 153 of the device bracket 150. The first vertical adapter bracket 178 and the second vertical adapter bracket 180 are operatively connected to the top horizontal adapter bracket 171 and the bottom horizontal adapter bracket 172 by engaging the hook 183 disposed at the first end 181 of the first vertical adapter bracket 178 and the second vertical adapter bracket 180 with the upper most lip 174 of the top horizontal adapter bracket 171 and engaging the hook 183 disposed at the second end 182 of the first vertical adapter bracket 178 and the second vertical adapter bracket 180 with the lower most lip 174 of the bottom horizontal adapter bracket 172. The lateral location of the first vertical adapter bracket 178 and the second vertical adapter bracket 180 is adjustable along the length of the top and the bottom horizontal adapter bracket 171 and 172. The first vertical adapter bracket 178 and the second vertical adapter bracket 180 may be fixed laterally by aligning one or more of the plurality of openings 184 on the first and the second vertical adapter bracket 178 and 180 with one or more of the plurality of openings 177 on the top and the bottom horizontal adapter bracket 171 and 172 and passing connecting elements through the openings.

As depicted in FIGS. 1-3, the receiver housing assembly 192 is operatively connected to the second vertical adapter bracket 180 such that the second compartment 199 is oriented above the first compartment 197. In one embodiment, an adhesive-backed magnet is affixed to one of the plurality of walls 200 of the receiver housing 194, permitting the receiver housing assembly 192 to be operatively connected to the second vertical adapter bracket 180. It should be recognized, however, that the specific position of the receiver housing assembly 192 may change in different embodiments. For example, other alternative embodiments may comprise operatively connecting the receiver housing assembly 192 to the device mount portion 149, the surface mount portion 100, the first vertical adapter bracket 178, the top horizontal adapter bracket 171, or the bottom horizontal adapter bracket 172. Similarly, the specific orientation of the of the receiver housing assembly 192 may change in different embodiments. For example, in other alternative embodiments, the receiver housing assembly 192 may be oriented such that the first compartment 197 is oriented above the second compartment 199. In addition, while an embodiment uses magnetic force to affix the receiver housing assembly 192, other alternative embodiments may affix the receiver housing assembly 192 to the mounting system 10 by other types of mechanical fastening, such as bolts, screws, welding, zip ties, or the like. Finally, other alternative embodiments may comprise a receiver housing assembly 192 that is an integral component of the mounting system 10. As one non-limiting example, such an alternative embodiment may comprise an adapter bracket assembly 170 comprising an integrally-formed receiver housing assembly 192.

To contain the wireless receiver 190 and the adapter 222, the wireless receiver 190 may be placed in the first end 201 of the receiver housing 194 and oriented such that the plurality of jacks 191 are located proximate to a cutout 205, the cutout providing access to the plurality of jacks 191 and an outlet for connectors to be routed to a television. The adapter 222 is placed in the second end 203 of the receiver housing 194. The receiver housing lid 206 is lowered onto the receiver housing 194 and is retained on the receiver housing 194 by engagement of the outer surface of tabs 214 with the inner surface of walls 200. As described above, the aperture tab 220 extends into the compartment 195, partitioning compartment 195 into the first compartment 197 and the second compartment 199. The aperture tab 220, thus serves to separate and confine the wireless receiver 190 and the adapter 222.

FIG. 25 depicts an exemplary representation of a mounting system according to various embodiments, with the wireless receiver 190 operating within a broader wireless communication system 230 for wirelessly transmitting and receiving a signal from a media source 232. The wireless communication system 230 includes the media source 232, a power supply 234, a transmitter 236, a wireless receiver 190, a plurality of connectors 238, and a display 240. The transmitter 236 is operatively connected to the media source 232 via one or more of the plurality of connectors 238. The transmitter 236 is configured to receive an output signal from the media source 232 and to transmit a corresponding signal. The wireless receiver 190 is operatively connected to the display 240 via one or more of the plurality of connectors 238. The wireless receiver 190 is configured to receive a signal transmitted from the transmitter 236 and to relay the signal to the display 240. In one embodiment, the wireless receiver 190 may be mounted to the mounting system 10, permitting the one or more of the plurality of connectors 238 connecting the wireless receiver 190 to the display 240 to be hidden behind the display 240.

Upon receipt of an output signal from the media source 232, the transmitter 236 processes and wirelessly transmits the signal. Upon detection of the transmitted signal, the wireless receiver 190 processes and relays the signal to the display 240. Thus, by wirelessly transmitting the output signal of the media source 232 to a wireless receiver 190, users do not need to route a cable between the media source 232 and the display 240, permitting a clean installation.

FIGS. 26-33 depict another embodiment of the present invention, where a projector mounting system 300 includes a wireless housing module 310 for housing the wireless receiver 190. As shown in FIGS. 26-31, the projector mounting system 300 is configured to operatively attach to a projector 320 for exhibiting images, video, etc. on a projection screen, wall or similar surface. The projector mounting system 300 depicted in FIGS. 26-31 comprises a projector mounting assembly 330, which couples to a surface of the projector 320, and a projector adjustment assembly 340, which may be used to adjust the orientation of the projector 320 in one or more of the pitch, yaw and roll directions.

Various types of projector mounting assemblies 330 and projector adjustment assemblies 340 are known in the art and are marketed, for example, by Peerless Industries of Aurora, Ill. The projector mounting assembly 330 depicted in FIGS. 26-33 comprises a base 350 having a periphery 360 disposed about the base 350, and a plurality of arm assemblies 370 that are selectively locatable and connectable along the periphery 360. Each arm assembly 370 is configured with at least one connection portion 380 adapted to operatively couple to the projector 320. Each arm assembly 370 may further be selectively pivoted about an axis relative to the location where the arm assembly 370 is connected to the periphery 360. Additionally, each arm assembly 370 may also be selectively translated, extending and retracting the arm assembly 370 in a radial direction relative to the location where the respective arm assembly 370 is connected to the periphery 360. Coupling assemblies 390 may be implemented in operatively connecting the arm assemblies 370 to the base 350. The orientation of each arm assembly 370 and each connection portion 380 may be selectively fixed in relation to the periphery 360 via a respective coupling assembly 390. Each connection portion 380 may also be selectively translated in a direction substantially parallel to the pivot axis to accommodate coupling features of various elevations on the projector 320. Various exemplary projector mounting assemblies are discussed in detail in U.S. Publication No. 2010/0237210, entitled "Mounting System" and the contents of which are incorporated herein by reference.

As shown in FIGS. 26-33, the projector mounting system 300 further includes the wireless housing module 310 connected thereto. In the embodiment depicted in FIGS. 26-33, the wireless housing module 310 is coupled directly to the projector mounting assembly 330, but the wireless housing module 310 could instead be coupled to the projector adjustment assembly 340 in various embodiments. The wireless housing module 310 is configured to house and/or operatively connect to the wireless receiver 190 so that the wireless receiver 190 may be positioned in close proximity to the projector 320 with which the wireless receiver 190 communicates.

Figure 32:
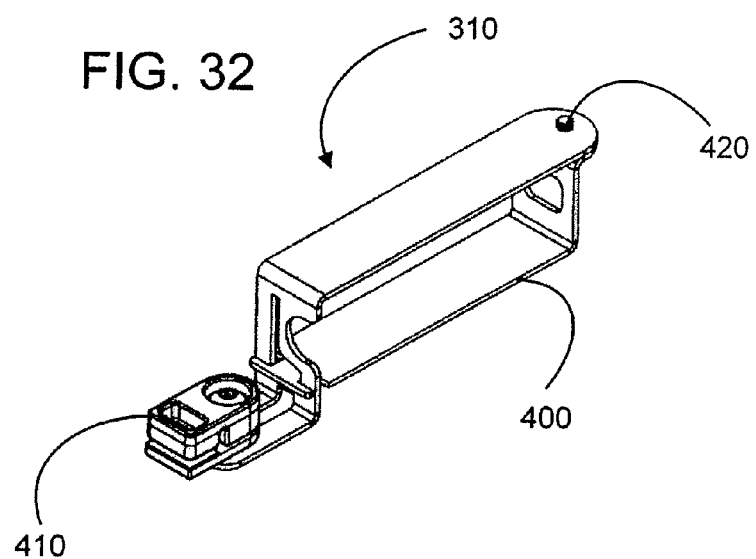
FIG. 32 is a perspective view of wireless receiver bracket assembly for use in the projector mount assembly depicted in FIGS. 26-31.
Figure 33:
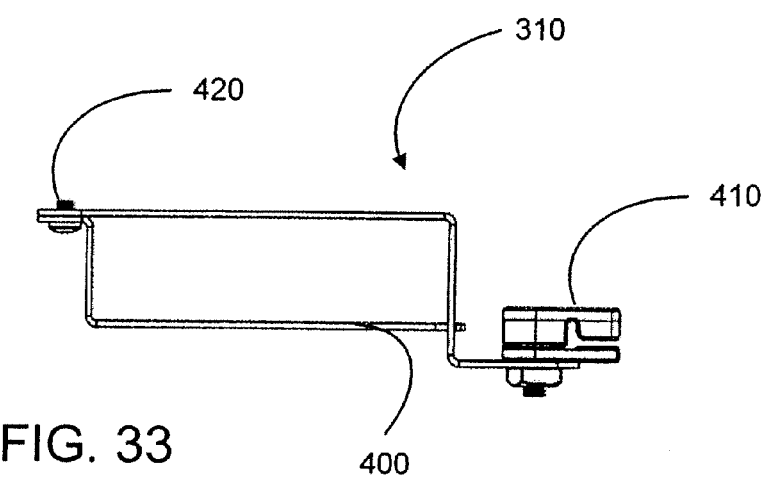
FIG. 33 is a left side view of the wireless receiver bracket assembly of FIG. 32.

As best shown in FIGS. 32-33, the wireless housing module 310 according to one embodiment includes a housing structure 400 sized to surround and hold a portion of the wireless receiver 190. In the embodiment depicted in FIGS. 32-33, the housing structure 400 may be "opened" by removing a security fastener 420. The wireless receiver 190 is then placed within the housing structure, and the wireless receiver 190 is then secured within the housing structure by inserting the security fastener 420 into the housing structure 400.

A wireless module coupling mechanism 410 is operatively connected to the housing structure 400 and is used to connect the wireless housing module to the periphery 360 of the base 350. In one embodiment, a "clamping" action by the wireless module coupling mechanism 410 around the periphery 360 is used to selectively secure the wireless module coupling mechanism 410 to the periphery 360. However, other types of connection or coupling arrangements may also be used. Additionally, it is also possible for the wireless housing module 310 to be permanently secured to the base 350 in certain embodiments. Furthermore, it should be noted that the wireless housing module 310 may be coupled to a wide variety of projector mounting assemblies 330 or projector adjustment assemblies 340 in different embodiments.

FIGS. 34-36 depict a mounting system 500 for attaching a display device to a surface and housing a wireless receiver 505 for communicating a wireless signal to the display device in accordance with yet another embodiment. The mounting system 500 depicted in FIGS. 34-36 is similar in many respects to the mounting system 10 depicted in FIGS. 1-8. However, the mounting system 500 of FIGS. 34-36 also includes a power module assembly 510 operatively connected the rest of the mounting system 500. In this particular embodiment, the power module assembly 510 is connected to the remainder of the mounting system 500 via a device mount portion 515. As is the case above for the receiver housing assembly, however, this attachment could occur via other components of the mounting system 500 as well. The power module assembly 510 is sized and configured to house a power receptacle (not shown), for example of the type incorporated into the power cord of a flat panel television. By placing the power receptacle within the power module assembly 510, the power receptacle is secured in a safe position such that it is not simply hanging from the flat panel television, which would otherwise result in added stresses to the power cable and, over time, potential damage to the power cable and the flat panel television. The power module assembly 510 may also include space for housing excess power cabling from the display device and/or other electronic devices connected thereto.

The mounting system 500 depicted in FIGS. 34-37 also includes a first, second, third and fourth lateral adjustment members 530, 535, 540 and 545, respectively, that are configured to movably connect the power module assembly 510 and/or a receiver housing assembly 550 to a respective device mount portion 515. In the particular embodiment depicted in FIGS. 34-36, each of the first, second, third and fourth lateral adjustment members 530, 535, 540 and 545 possess the same configuration. However, it should be understood that both the number of lateral adjustment members and the configuration of each lateral adjustment member may vary.

Each of the first, second, third and fourth lateral adjustment members 530, 535, 540 and 545 depicted in FIGS. 34-36 possess a first lateral adjustment opening 555 through which a fastener 520 may pass through before engaging the respective device mount portion 515 (through an opening located therein or by other mechanisms known in the art). Each of the first, second, third and fourth lateral adjustment members 530, 535, 540 and 545 depicted in FIGS. 34-36 also includes a second lateral adjustment opening 560. In this particular embodiment, the second lateral adjustment opening 560 comprises a slot. The slot allows the lateral positioning of the power module assembly 510 and/or the receiver housing assembly 550 relative to connected device mount portion 515 to be adjusted. This provides an added benefit to an installer of the mounting system 500, as it permits him or her to place the receiver housing assembly 550 and or the power module assembly 510 in positions where there is an optimal clearance relative to the rest of the mounting system 500 and the attached audio/visual device as well as from environmental projections and obstructions emanating from the surface to which the mounting system 500 is mounted, associated cables and dongles, and other items.

The power module assembly 510 includes a power module assembly flange 570 extending therefrom. The power module assembly flange 570 includes one or more power module assembly flange openings 575 therein, each of which is sized and positioned to accept the same fastener 520 that passes through the associated lateral adjustment member 530 or 535. In the embodiment depicted in FIGS. 34-36, each power module assembly flange opening 575 comprises a slot. This provides even greater flexibility to the installer, permitting him or her to adjust the vertical position of the power module assembly 510 and or the individual lateral adjustment members 530 and 535 (when the longitudinal axis of the power module assembly flange openings 575 are oriented substantially perpendicular to the ground) in order to better avoid obstructions and the like. It should be noted, however, that rather than using power module assembly flange openings 575, however, other coupling mechanisms such as clamping devices may be used to couple the lateral adjustment members 530 and 535 to the power module assembly 510. The use of multiple slots and other openings on the device mount portion 515 (which are also used for mounting the audio/visual device) provide further vertical flexibility in positioning the power module assembly 510.

In the case of the receiver housing assembly 550, the receiver housing assembly 550 includes a the receiver housing assembly flange 580 extending therefrom. The receiver housing assembly flange 580 includes a one or more receiver housing assembly flange openings 585 therein, each of which is sized and positioned to accept the same fastener 520 that passes through the associated lateral adjustment member 540 or 545. In the embodiment depicted in FIGS. 34-36, each receiver housing assembly flange opening 585 comprises a slot. This provides even greater flexibility to the installer, permitting him or her to just the vertical position of the receiver housing assembly 550 and or the individual lateral adjustment members 540 and 545 (when the longitudinal axis of the receiving housing assembly flange openings 585 are oriented substantially perpendicular to the ground) in order to better avoid obstructions and the like. It should be noted, however, that rather than using receiver housing assembly flange openings 585, however, other coupling mechanisms such as clamping devices may be used to couple the lateral adjustment members 540 and 545 to the receiver housing assembly 550. The use of multiple slots and other openings on the device mount portion 515 (which are also used for mounting the audio/visual device) provide further vertical flexibility in positioning the receiver housing assembly 550.

FIG. 37 is an exploded view of the receiver housing assembly 550 of FIGS. 34-36 for use in housing the wireless receiver 505. The receiver housing assembly 550 of FIG. 37 is similar in many respects to the receiver housing assembly 192 of FIG. 9. However, the receiving housing assembly 550 of FIG. 37 also includes the aforementioned receiver housing assembly flange 580 extending from a receiver housing lid 590. In the embodiment depicted in FIG. 37, the receiver housing assembly flange 580 may be formed as a single piece with some or all of the receiver housing lid 590. However, it is also possible for the receiver housing assembly flange 580 to be formed as a separate component which is then fastened or otherwise connected to the rest of the receiver housing assembly 550.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:
1. A system for attaching a display device to a surface separate from the display device and housing a wireless signal receiver, comprising:
   a surface mount portion configured to attach to the separate surface;
   a device mount portion operatively connected to the surface mount portion, the device mount portion including a device mounting surface configured to attach to the separate display device; and
   a receiver housing assembly configured to house the wireless receiver, the receiver housing assembly connected to one of a receiver housing assembly mounting surface of the device mount portion and a receiver housing assembly mounting surface of the surface mount portion.

2. The system of claim 1, further comprising the wireless receiver completely disposed within the receiver housing assembly, the wireless receiver configured to communicate a high definition wireless signal.

3. The system of claim 1, wherein the receiver housing assembly is removable from the one of the device mount portion and the surface mount portion.

4. The system of claim 1, wherein the receiver housing assembly is not removable from the one of the device mount portion and the surface mount portion.

5. The system of claim 1, wherein the receiver housing assembly comprises a receiver housing and a receiver housing lid, the receiver housing forming a compartment defined by a bottom and a plurality of walls extending therefrom, the receiver housing lid operatively engageable with the receiver housing.

6. The system of claim 5, wherein the receiver housing includes at least one cutout in at least one of the plurality of walls, the at least one cutout configured to provide access to the wireless receiver disposed within the receiver housing assembly for routing connectors between the wireless receiver and a device that is separate from the system.

7. The system of claim 5, wherein the receiver housing includes at least one receiver housing opening that is devoid of any portion of the system, thereby improving transmission strength of a wireless signal to the wireless receiver disposed within the compartment.

8. The system of claim 5, wherein the receiver housing lid further comprises an aperture tab, wherein when the receiver housing lid is operatively engaged with the receiver housing, the aperture tab partitions the compartment into a first compartment and a second compartment, wherein the wireless receiver is completely housed within the first compartment, and wherein an adapter is completely housed within the second compartment.

9. The system of claim 1, wherein the system is configured to mount a projector device to the surface.

10. The system of claim 1, wherein the system is configured to mount a flat panel television to the surface.

11. The system of claim 1, further comprising a power module assembly configured to house a power module configured to supply power to the separate display device when connected thereto, the power module assembly operatively connected to the device mount portion.

12. The system of claim 1, wherein the position of the receiver housing assembly relative to the device mount portion is adjustable.

13. The system of claim 12, further comprising at least one lateral adjustment member coupled to both the receiver housing assembly and the device mount portion, the at least one lateral adjustment member configured to permit a distance between the receiver housing assembly and the device mount portion to vary.

14. The system of claim 13, wherein the receiver housing assembly includes a receiver housing assembly flange extending therefrom, and wherein the a fastener is used to couple the at least one lateral adjustment member to the receiver housing assembly via the receiver housing assembly.

15. A system for attaching a device to a surface and housing a wireless signal receiver, comprising:
   a surface mount portion configured to attach to the surface;
   a device mount portion operatively connected to the surface mount portion;

a receiver housing assembly configured to house the wireless receiver, the receiver housing assembly connected to one of the device mount portion and the surface mount portion; and a power module assembly configured to house a power module configured to supply power to the device when connected thereto, the power module assembly operatively connected to the device mount portion, wherein the power module assembly further includes a power module frame that is adjustable relative to the device mount portion and the surface mount portion, and wherein the power module is housed within the power module frame, such that the position of the power module is adjustable relative to the device mount portion and the surface mount portion when the power module is connected to the device.

16. The system of claim 15, further comprising at least one lateral adjustment member coupled to an external surface of the power module frame of the power module assembly and to an external surface of the device mount portion, wherein the at least one lateral adjustment member is configured to permit a distance between the power module assembly and the device mount portion to be varied.

17. The system of claim 16, wherein the power module frame includes a power module frame flange extending therefrom, and wherein a fastener is used to couple the at least one lateral adjustment member to the power module assembly via the power module frame flange.

18. A system for attaching an audio/visual device to a surface and housing a wireless signal receiver, comprising:

a surface mount portion configured to attach to the surface;

a device mount portion operatively connected to the surface mount portion; and a receiver housing assembly configured to house the wireless receiver, the receiver housing assembly connected to one of the device mount portion and the surface mount portion;

at least one lateral adjustment member connecting the receiver housing assembly to the one of the device mount portion and the surface mount portion such that a distance between the receiver housing assembly and the device mount portion may be varied; and a power module assembly including a frame that is configured to house a power module associated with the audio/visual device, wherein the receiver housing assembly includes a receiver housing assembly flange extending therefrom, wherein a fastener is used to couple the at least one lateral adjustment member to the receiver housing assembly via the receiver housing assembly, and wherein the frame of the power module assembly is operatively connected to the device mount portion via another lateral adjustment member that allows the power module assembly to be moved laterally relative to the device mount portion when the power module is electrically connected to the audio/visual device.

\* \* \* \* \*